H. F. BRANDES.
EQUALIZER.
APPLICATION FILED MAR. 25, 1909.
946,422.
Patented Jan. 11, 1910.
2 SHEETS—SHEET 1.
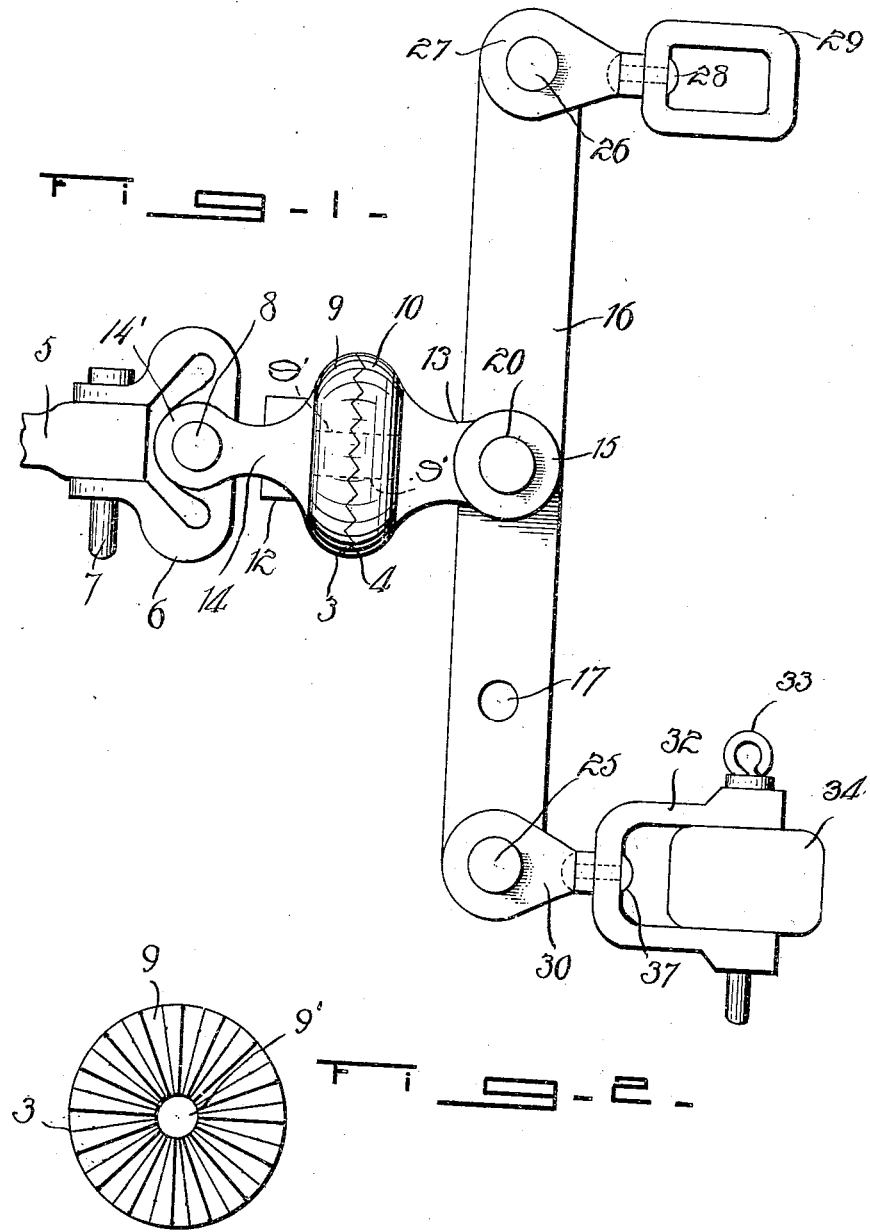
Inventor
HENRY F. BRANDES.

H. F. BRANDES.
EQUALIZER.
APPLICATION FILED MAR. 25, 1909.
946,422.
Patented Jan. 11, 1910.
2 SHEETS—SHEET 2.
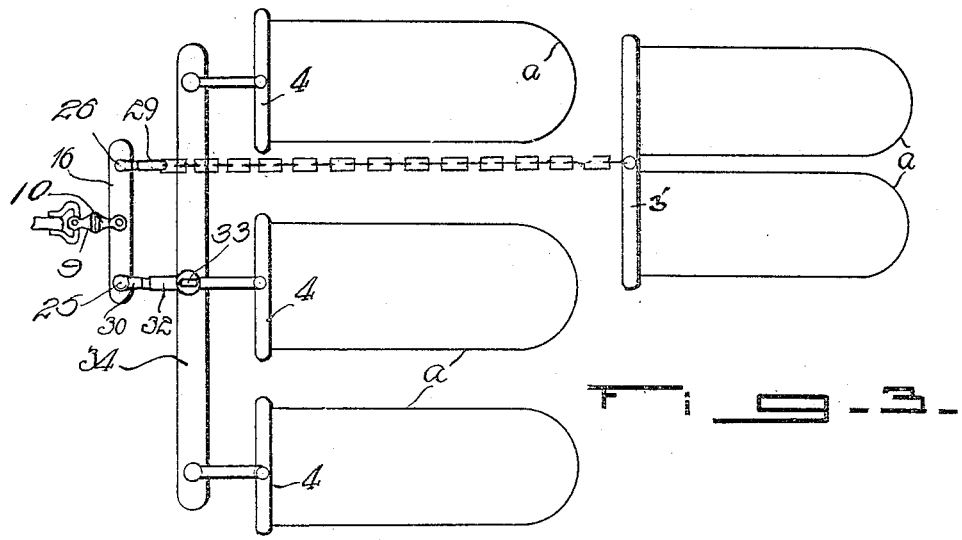
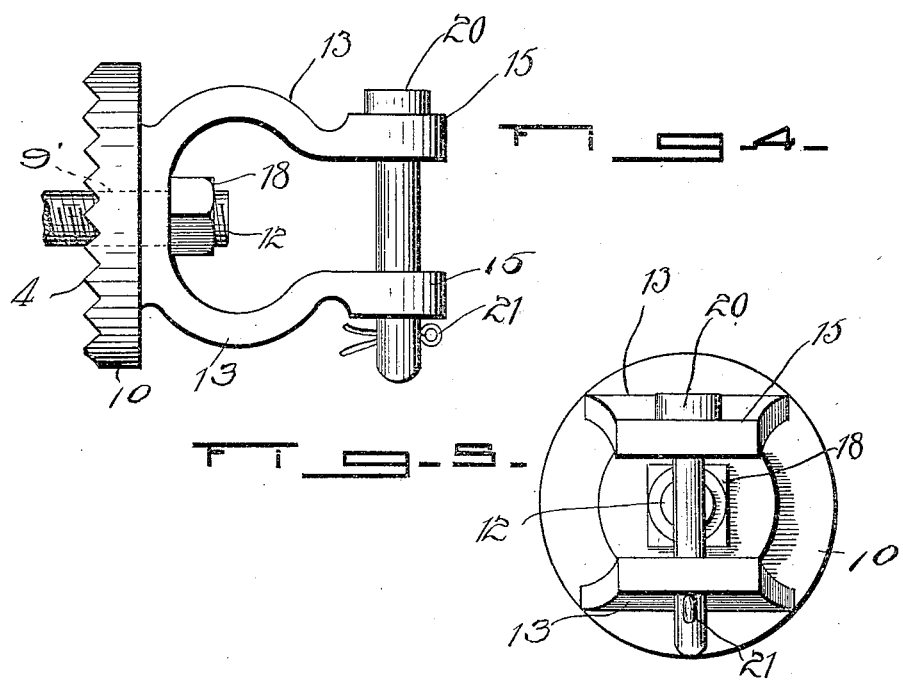
Witnesses
C. E. Chandler.
E. L. Chandler
Inventor
HENRY F. BRANDES.
By Woodward & Chandlee
Attorneys

UNITED STATES PATENT OFFICE.

HENRY F. BRANDES, OF LONG POINT, ILLINOIS.

EQUALIZER.

946,422.  Specification of Letters Patent.  Patented Jan. 11, 1910.

Application filed March 25, 1909. Serial No. 485,729.

*To all whom it may concern:*

Be it known that I, HENRY F. BRANDES, a citizen of the United States, residing at Long Point, in the county of Livingston and State of Illinois, have invented certain new and useful Improvements in Equalizers, of which the following is a specification.

This invention relates to certain new and useful improvements in draft equalizers.

The object of my invention is, to provide a light, simply-constructed evener, arranged so that the same may be used with an even or odd number of draft animals, to equalize the draft strain.

A further object is to provide a coupling, by means of which the draft bar may be held in an adjustable position at the end of a plow or other implement.

With these and other objects in view the present invention consists in the combination and arrangement of parts, as will be hereinafter more fully described and particularly pointed out in the appended claim, it being understood that changes in the specific structure shown and described may be made within the scope of the claim without departing from the spirit of the invention.

In the drawings forming a part of this specification and in which like numerals of reference indicate similar parts in the several views, Figure 1 shows an elevational view of a draft equalizer embodying my invention, Fig. 2 is a face view of one of the coupling members, Fig. 3 is a top view of a draft equalizer disclosing the same as arranged when used in connection with five draft animals, Fig. 4 is an enlarged detached side view of one of the coupling members, Fig. 5 is a rear view of one of the coupling members.

In the accompanying drawings, 5 represents the forward broken portion of a plow beam, 6 the shackle, and 7 the pin securing the shackle to the plow beam. The shackle 6 carries the usual shackle pin 8, which in this instance is made to carry the rear member of my coupling.

My coupling comprises two similar members which are pivotally connected by means of a suitable bolt. The rear member is slightly smaller than the forward member and comprises the circular body portion 9, having a ratchet face provided with a central bore 9', as shown in Fig. 2. Extending from this disk or circular body 9, are two similar arms marked 14, which are curved laterally outward and terminate in the perforated securing ears 14' arranged to receive the shackle pin 8 by means of which this rear coupling member is secured to the shackle. The forward shackle is of a size somewhat larger than the rear shackle and comprises a circular or disk-shaped body 10, having a ratchet face which face is also provided with a central bore, and from this circular body portion 10 extend the two similar arms 13, shown in Fig. 4. These arms 13 terminate in the perforated ears 15, arranged to receive the bolt 20, which is provided with a cotter pin 21, so that this bolt is removably held in the securing ears 15. Held within the centrally positioned bore of this forward equalizer member is a bolt 12, the head 12' of which is held against the rear portion of the rear coupling member, as shown in Fig. 1. Threading upon this bolt 12, is a nut 18 and this nut is held between the arms 13 of the forward coupling member, as disclosed in Fig. 4. Sufficient space is provided between these curved arms 13 so that a wrench may be carried over the nut 18. The ratchet faces 3 and 4 of these couplings 9 and 10, are made complementary one to the other so that when the members are united by means of the bolt 12, they may be firmly but removably as well as adjustably secured. In releasing the nut 18 slightly, the forward member may be rotated, so that the equalizer bar 16 carried by this forward coupling, may be carried into a vertical or horizontal position, or into any intermediate position.

The bolt 20 is arranged to carry the equalizer bar 16 as clearly disclosed in Fig. 1. Near each end this bar 16, is provided with a bolt, marked 25 and 26 respectively in the drawings. The bolt 26 carries a swivel ear 27, the pin 28 of which revolubly supports the link 29. The bolt 25 at the opposite end, carries the ear 30, the pin 37 of which carries the swivel clevis 32 which is arranged to hold the pin 33 carrying the doubletree 34.

My draft equalizer is arranged to be used with either one, two, three, four, or five draft animals. In removing the bolts 25 and 26 the trace chains of a single draft animal may be secured to the equalizer bar 16. If two draft animals are used swingletrees are carried by these bolts 25 and 26. If three horses are required, the swingletree is secured to the pin 26, while the clevis 32 is carried to the intermediate bolt opening 17 as shown on Fig. 1, and is there secured and provided with a doubletree.

Used for the purpose just set forth, the equalizer bar 16, is held in a horizontal position. If it were required to use the equalizer in connection with four draft animals, the bolt 12, is released and the bar 16 adjusted in a vertical position, as shown in Fig. 1. The clevis 32 in that position will be at the lower end of the equalizer bar 16. Two animals are then secured to the doubletrees 34, while to the link 29 would be secured a suitable chain, which would be prolonged between the rear draft animals, and at its forward end carry a double tree, to which the two lead animals would be secured. To arrange the equalizer for five horses the equalizer bar 16 is carried into a horizontal position, and the doubletree and swingletree are secured as has been described for a three horse equalizer, with the difference that three horses are secured to the doubletree 34 and two horses to the link 29, as shown in Fig. 3.

And having thus described my said invention, what I claim as new and desire to obtain by United States Letters Patent is:

In an equalizer, the combination with an equalizing bar having two terminal and two intermediately positioned bolt openings, of a terminal bolt held within one of said terminal openings, an ear carried by said bolt, a swivel link carried by said ear, a bolt held within said remaining terminal opening, an ear carried by said last mentioned bolt, a clevis swiveled to said last mentioned ear, a bolt held within one of said intermediately positioned openings, a shackle pin, a rear coupling member comprising a circular body portion having a ratchet face, a central bore, and two similar perforated arms carrying said shackle pin, a forward coupling member comprising a circular body having a ratchet face complementary to said first mentioned ratchet face, two extending perforated arms and a centrally positioned bore, said intermediately positioned bolt being carried by said last mentioned arms, and a bolt held within said central bores to adjustably and revolubly connect said two coupling members, as and for the purpose set forth.

In testimony whereof I affix my signature, in presence of two witnesses.

HENRY F. BRANDES.

Witnesses:
   CHARLES MINARD,
   ARTHUR BRANDES.